(12) United States Patent
Willenberg et al.

(10) Patent No.: US 10,491,103 B2
(45) Date of Patent: Nov. 26, 2019

(54) STEP-UP CONVERTER, CORRESPONDING INVERTER AND METHOD OF OPERATION

(71) Applicant: SMA Solar Technology AG, Niestetal (DE)

(72) Inventors: Mario Willenberg, Paderborn (DE); Raphael Knoke, Altenbeken (DE); Andreas Falk, Kassel (DE); Robert Stala, Cracow (PL); Marek Rylko, Bielsko-Biala (PL); Jerzy Maslon, Chrzanow (PL); Andrzej Mondzik, Skarzysko Koscielne (PL); Slawomir Szot, Krosno (PL); Adam Penczek, Cracow (PL); Mitosz Szarek, Cracow (PL)

(73) Assignee: SMA Solar Technology AG, Niestetal (DE)

( * ) Notice: Subject to any disclaimer, the term of this patent is extended or adjusted under 35 U.S.C. 154(b) by 367 days.

(21) Appl. No.: 15/010,061

(22) Filed: Jan. 29, 2016

(65) Prior Publication Data

US 2016/0226372 A1    Aug. 4, 2016

Related U.S. Application Data

(63) Continuation of application No. PCT/EP2014/066320, filed on Jul. 29, 2014.

(30) Foreign Application Priority Data

Jul. 29, 2013    (DE) .................. 10 2013 108 079

(51) Int. Cl.
*H02M 1/34*    (2007.01)
*H02M 3/158*    (2006.01)
*H02M 7/04*    (2006.01)

(52) U.S. Cl.
CPC ........... *H02M 1/34* (2013.01); *H02M 3/1584* (2013.01); *H02M 7/04* (2013.01);
(Continued)

(58) Field of Classification Search
CPC ........ H02M 1/34; H02M 3/155; H02M 3/156; H02M 3/158; H02M 3/1584; H02M 7/04;
(Continued)

(56) References Cited

U.S. PATENT DOCUMENTS 7,385,833 B2    6/2008 Keung
9,060,396 B2 *  6/2015 Huang ............... H05B 33/0815
(Continued)

FOREIGN PATENT DOCUMENTS

DE          2639589 A1     3/1978
JP       2011036086 A     2/2011
(Continued)

OTHER PUBLICATIONS

International Search Report International Application No. PCT/EP2014/066320 dated Oct. 28, 2015.

*Primary Examiner* — Yusef A Ahmed
*Assistant Examiner* — Shahzeb K Ahmad
(74) *Attorney, Agent, or Firm* — Eschweiler & Potashnik, LLC

(57) ABSTRACT

A step-up converter includes a first inductance electrically connecting a first DC voltage input of the step-up converter to a first junction point, a step-up converter switch connecting the first junction point to a second DC voltage input and a second DC voltage output of the step-up converter, a first diode connecting the first junction point to a first DC voltage output of the step-up converter, and a snubber circuit comprising a charging path and a discharging path. The discharging path runs as a series connection of a capacitor and a second diode from the first junction point to the first DC
(Continued)

voltage output, and the charging path is connected at its one end to a junction point between the capacitor and the second diode and is arranged such that the capacitor is charged when the step-up converter switch is switched on.

27 Claims, 13 Drawing Sheets

(52) U.S. Cl.
CPC .... *H02M 2001/346* (2013.01); *Y02B 70/1491* (2013.01); *Y02E 10/56* (2013.01)

(58) Field of Classification Search
CPC .......... H02M 7/42; H02M 7/44; H02M 7/483; H02M 7/487; H02M 7/493; H02M 2007/4835; H02M 2007/4815; H02M 2001/346; Y02B 70/1491; Y02E 10/56
See application file for complete search history.

(56) References Cited

U.S. PATENT DOCUMENTS

| | | |
|---|---|---|
| 2006/0274558 A1 | 12/2006 | Keung |
| 2008/0094866 A1 | 4/2008 | Bauman et al. |
| 2009/0244944 A1* | 10/2009 | Jang ................. H02J 7/345 363/126 |
| 2012/0068678 A1 | 3/2012 | Hatae et al. |
| 2012/0163052 A1* | 6/2012 | Yonezawa .......... H02M 1/4225 363/126 |
| 2014/0062446 A1* | 3/2014 | Ikriannikov ............ H02M 1/14 323/304 |
| 2015/0009728 A1* | 1/2015 | Sugita ................. H02M 3/156 363/45 |
| 2016/0268895 A1 | 9/2016 | Sadohara |

FOREIGN PATENT DOCUMENTS

| | | |
|---|---|---|
| JP | 2013106433 A | 5/2013 |
| WO | 9423488 A1 | 10/1994 |

* cited by examiner

STEP-UP CONVERTER, CORRESPONDING INVERTER AND METHOD OF OPERATION

CROSS REFERENCE TO RELATED APPLICATIONS

This application claims priority to International Patent Application number PCT/EP2014/066320, filed on Jul. 29, 2014, which claims priority to German Patent Application number 10 2013 108 079.0, filed on Jul. 29, 2013, and is hereby incorporated by reference in its entirety.

FIELD

The disclosure relates to a step-up converter and to an operating method for a step-up converter. Furthermore, the disclosure relates to an inverter, in particular a photovoltaic inverter, comprising such a step-up converter.

BACKGROUND

Step-up converters are used in particular in photovoltaic installations for adapting the DC voltage of individual strings to the DC voltage of a common intermediate circuit. In this case, operation of the step-up converter with the best possible efficiency is desirable to avoid energy losses and to reduce the outlay for cooling the components of the step-up converter, in particular a semiconductor switch of the step-up converter. It is known from resonance converters, for example, that low-loss switching of the semiconductor switch can be achieved by the switch being switched at points in time at which the switch is free of current or free of voltage. This is referred to as soft switching.

The document DE2639589A1 discloses a step-up converter with an arrangement of an inductance, a step-up converter switch and a step-up converter diode between DC voltage inputs and DC voltage outputs as it is conventional for step-up converters. The step-up converter comprises a snubber circuit having a charging path and a discharging path, wherein the discharging path runs as a series connection of a capacitor and a diode in parallel with the step-up converter diode. Via the charging path, which comprises a series connection of a further diode and a further inductance and one end of which is connected to a junction point between the capacitor and the diode, the capacitor is charged when the step-up converter switch is switched on, for which purpose a voltage at an amount of half the output voltage of the step-up converter is applied to the other end of the charging path. Concerning this, the document DE2639589A1 discloses that the charging path can be connected to the center point of a divided output capacitance between the DC voltage outputs, and for this furthermore it discloses a compensation circuit that can be used to compensate for an unequal discharge of the two capacitances of the divided output capacitance that is caused by the charging circuit.

The document U.S. Pat. No. 7,385,833B2 likewise discloses a step-up converter with the arrangement of an inductance, a step-up converter switch and a step-up converter diode between DC voltage inputs and DC voltage outputs as it is conventional for step-up converters. The step-up converter comprises a snubber circuit having a charging path and a discharging path, wherein the discharging path runs as a series connection of a capacitor and a diode in parallel with the step-up converter diode, and wherein the charging path, one end of which is connected to a junction point between the capacitor and the diode, comprises a series connection of a further diode and a further inductance. The other end of the charging path is connected to a line of the step-up converter that connects one of the DC voltage inputs to one of the DC voltage outputs. In order to charge the capacitor when the step-up converter switch is switched on, the further inductance in the charging path is magnetically coupled to the inductance of the step-up converter. The energy for charging the capacitor is thus drawn from an energy source connected to the DC voltage inputs.

The document US20080094866A1 discloses using a step-up converter with the arrangement of an inductance, a step-up converter switch and a step-up converter diode between DC voltage inputs and DC voltage outputs as it is conventional for step-up converters. The step-up converter comprises an actively switched snubber circuit, in conjunction with a photovoltaic generator.

SUMMARY

Accordingly, the present disclosure is directed to a step-up converter that has an improved efficiency and that allows, in particular, a soft switching of a semiconductor switch of the step-up converter.

A step-up converter according to one embodiment of the disclosure comprises a first inductance electrically connecting a first DC voltage input of the step-up converter to a first junction point, and a step-up converter switch connecting the first junction point to a second DC voltage input and to a second DC voltage output, which is connected thereto, of the step-up converter. In addition, the step-up converter comprises a first diode connecting the first junction point to a first DC voltage output of the step-up converter. The step-up converter furthermore comprises a snubber circuit comprising a charging path and a discharging path, wherein the discharging path runs as a series connection of a capacitor and a second diode from the first junction point to the first DC voltage output and the charging path emanating from a junction point between the capacitor and the second diode is arranged such that the capacitor is charged when the step-up converter switch is switched on. This charging is effected without the use of further switches.

By means of the discharging path embodied as a series connection of the capacitor and the second diode it is achieved that the current through the first inductance, at the point in time when the step-up converter switch is switched off, at first does not commutate to the first diode, as would be the case in a conventional step-up converter, but rather to the discharging path, whereby the capacitor is discharged. Only after a complete discharge of the capacitor the current commutates to the first diode. The temporary bridging of the first diode via the discharging path results in voltage-free, that means soft, switching-off of the step-up converter switch, which considerably reduces the switching losses.

The renewed charging of the capacitor is effected via the charging path at the beginning of the switch-on phase of the step-up converter switch. Depending on the duration of the switch-on phase, partial charging or advantageously complete charging to the voltage value of the DC voltage output can be carried out during this. In one embodiment, therefore the capacitor is charged by means of the energy of an output capacitance arranged between the first and second DC voltage outputs.

However, it is just as well possible to draw the energy for charging the capacitor from the DC voltage input. For this purpose, the charging path is connected at its one end to the junction point between the capacitor and the second diode and at its other end to the first DC voltage input. Particularly advantageously in one embodiment, an input capacitance is arranged between the first and second DC voltage inputs in this case, and the charging path is arranged for charging the capacitor from the input capacitance.

The discharging path can be arranged in parallel with the first diode. Alternatively, however, it is also possible for the second diode to be arranged as part of the discharging path between the first DC voltage output and the first diode, such that the first diode is connected to a junction point between the capacitor and the second diode and thus to the first DC voltage output via the second diode.

In one embodiment of the step-up converter according to the disclosure, the charging path comprises a series connection of a resistance and a second switch, and connects the junction point between the capacitor and the second diode to the first DC voltage output or alternatively to the first DC voltage input. In this case, the resistance serves for limiting the charging current. In this embodiment, the second switch is arranged for switching on together with the step-up converter switch. In this case, the term switching on together includes that the second switch is switched on at least temporarily during the switch-on phase of the step-up converter switch. This also explicitly does not rule out the situation where the switching on of the second switch takes place at a predetermined period of time before the switching on of the step-up converter switch. In one embodiment the switching on of the second switch takes place synchronously with the switching on of the step-up converter switch.

In one embodiment of the disclosure, the charging path can comprise a series connection of a second inductance and a third diode.

In a further embodiment, the output capacitance comprises a series connection of a first and a second output capacitor, which are connected to one another via an intermediate point. In this case, the charging path connects the junction point between the capacitor and the second diode to the intermediate point of the divided output capacitance. The second inductance can be connected both to the intermediate point of the divided output capacitance and to the junction point between the capacitor and the second diode. The capacitor is charged by means of the energy of the output capacitor, which is connected to the second DC voltage output of the step-up converter. Hereafter, reference is made to this output capacitor as the output capacitance assigned to the snubber circuit.

Since an unequal voltage distribution between the first and second output capacitors is caused by this drawing of energy, the step-up converter according to the disclosure can be supplemented by a controllable compensation circuit. Such a compensation circuit can comprise at least one compensation switch that connects the first DC voltage output to the intermediate point of the divided output capacitance via the second inductance in a controllable manner. In addition, a freewheeling diode or a further switch can be arranged between the junction point connecting the second inductance to the compensation switch, and the second DC voltage output.

The variant of the step-up converter described earlier, in which the charging path is connected at its other end to the first DC voltage input, manages without a divided output or input capacitance and thus also without a compensation circuit. This should be considered to be the particular advantage of this variant. If the voltage between the DC voltage inputs is greater than half of the voltage between the DC voltage outputs, the capacitor is charged to the voltage value of the DC voltage output. Also in the case of lower voltage values the function of the circuit is still provided, although the reduction of the switching loading is not optimal then, i.e. the reduction of switching losses is somewhat lower then.

In order to compensate for the unequal drawing of energy from a divided output capacitance, it is possible to connect a further converter downstream of the step-up converter, the further converter being controlled such that in one embodiment it draws energy from the capacitor having the higher voltage relative to the other capacitor. In one possible embodiment of the disclosure, by way of example, a so-called three-level bridge, for example an NPC bridge, is connected to the DC voltage output of the step-up converter, the bridge being driven such that a compensating drawing of energy and thus a balancing of the voltage between the two output capacitors is achieved. It goes without saying that other circuits are also possible that enable a compensating drawing of energy from the divided intermediate circuit, for example a supply circuit for a control device of the step-up converter or of an electronic apparatus of which the step-up converter is part.

A further possibility for balancing the voltage at the two output capacitors comprises providing the step-up converter as a symmetrical step-up converter comprising a first and a second subunit. According to the disclosure, each of the two subunits comprises a snubber circuit, wherein the snubber circuits of the subunits are for example respectively assigned to one of the two output capacitors, i.e. are charged therefrom. In the case of the symmetrical step-up converter, the first and second subunits can also each comprise separate first and second DC voltage inputs. Given identical dimensioning of the capacitor and of the second inductance of both subunits, this then results in a balancing of the voltage even in the event of different input voltages at the two subunits. Otherwise, a balancing can be achieved by means of a suitably chosen difference between the driving frequencies of the two subunits. In this case, that subunit that is assigned to the output capacitance having the lower voltage is operated with a reduced driving frequency compared with the other subunit. In principle, such a step-up converter of a symmetrical embodiment can be operated by the driving frequency of the first subunit relative to the driving frequency of the second subunit being determined depending on the difference between the first and second output capacitances. In this way, it is likewise possible also to set and maintain a systematic asymmetry of the output voltage instead of a balancing of the output voltage.

In the case of a symmetrical step-up converter, the two first inductances of the two subunits can also be magnetically coupled. It goes without saying that in the case of a symmetrical step-up converter a controllable compensation circuit such as was described above in association with the fundamental explanation of the snubber circuit for the step-up converter can also be present for each of the two subunits. Just as well, for the symmetrical step-up converter the charging path can also be connected at its other end to the respective first DC voltage input in each case.

It is furthermore one aspect of the disclosure to complement an operating method for the step-up converter so as to compensate for an unequal drawing of energy that is caused by the snubber circuit by means of suitable measures, in particular by means of the measures described above. Ideally, a uniform distribution of the voltage between the series-connected output capacitors is aimed at within the scope of the adapted operating method.

In the case of an operating method for the step-up converter in which the charging path is connected at its other end to the first DC voltage input, in one embodiment the step-up converter is driven such that an output voltage between the first and second DC voltage outputs is greater than an input voltage between the first and second DC voltage inputs by less than a factor of 2. This ensures, as described above, that the capacitor is charged to the voltage value of the DC voltage output and the best possible reduction of switching losses is thus achieved.

In one particular advantageous embodiment, an inverter comprises a step-up converter according to the disclosure. In this case, the inverter can be, in particular, a photovoltaic inverter that converts a power from one or more photovoltaic generators, which is present as a DC voltage at the input or at inputs of the step-up converter, into a grid-conforming AC voltage for feeding into an energy supply grid. In this case, it is possible, in the embodiment of the step-up converter as a symmetrical step-up converter comprising separate DC voltage inputs for a first and a second subunit, to connect the DC voltage inputs of the first subunit to a first generator and the DC voltage inputs of the second subunit to a second generator different than the first generator. Separate DC voltage inputs are also existent within the meaning of this application if the two subunits comprise exactly one common DC voltage input.

As shown by way of example below on the basis of a step-down converter, a bidirectional converter and a buck-boost converter, the technical teaching of the disclosure is applicable to other types of converters. These types of converters comprise as common features an inductance and two switches, at least one of which is an active semiconductor switch. The other switch can alternatively also be a passive switch, for example a diode. The inductance and the two switches are arranged in a known manner between the DC voltage input terminals and the DC voltage output terminals. The snubber circuit in each case comprises a discharging path comprising a series connection of a capacitor and a diode, and a charging path that emanates from a junction point between the capacitor and the diode and that runs via a further diode and an inductance to a terminal of an output or input capacitance. The discharging path is arranged such that one of the two switches, in particular a passive switch that is present, is bridged by the discharging path, such that, upon the opening of the other switch during operation, a converter current is at first conducted via the capacitor instead of via said one switch, and discharges the capacitor. The one switch is supplied with current only after the complete discharge of the capacitor. Upon the closing of the other, active switch, the charging path is arranged such that the capacitor is charged again from the energy of an input capacitance or an output capacitance via the inductance. This results in a resonance-like charging process in which the current profile has a sinusoidal half-cycle.

BRIEF DESCRIPTION OF THE DRAWINGS

The disclosure is explained in further detail below with reference to figures. In this case, the figures serve for illustrating embodiments of the disclosure, but do not restrict the disclosure to the features shown.

DETAILED DESCRIPTION OF THE DISCLOSURE

Figure 1:
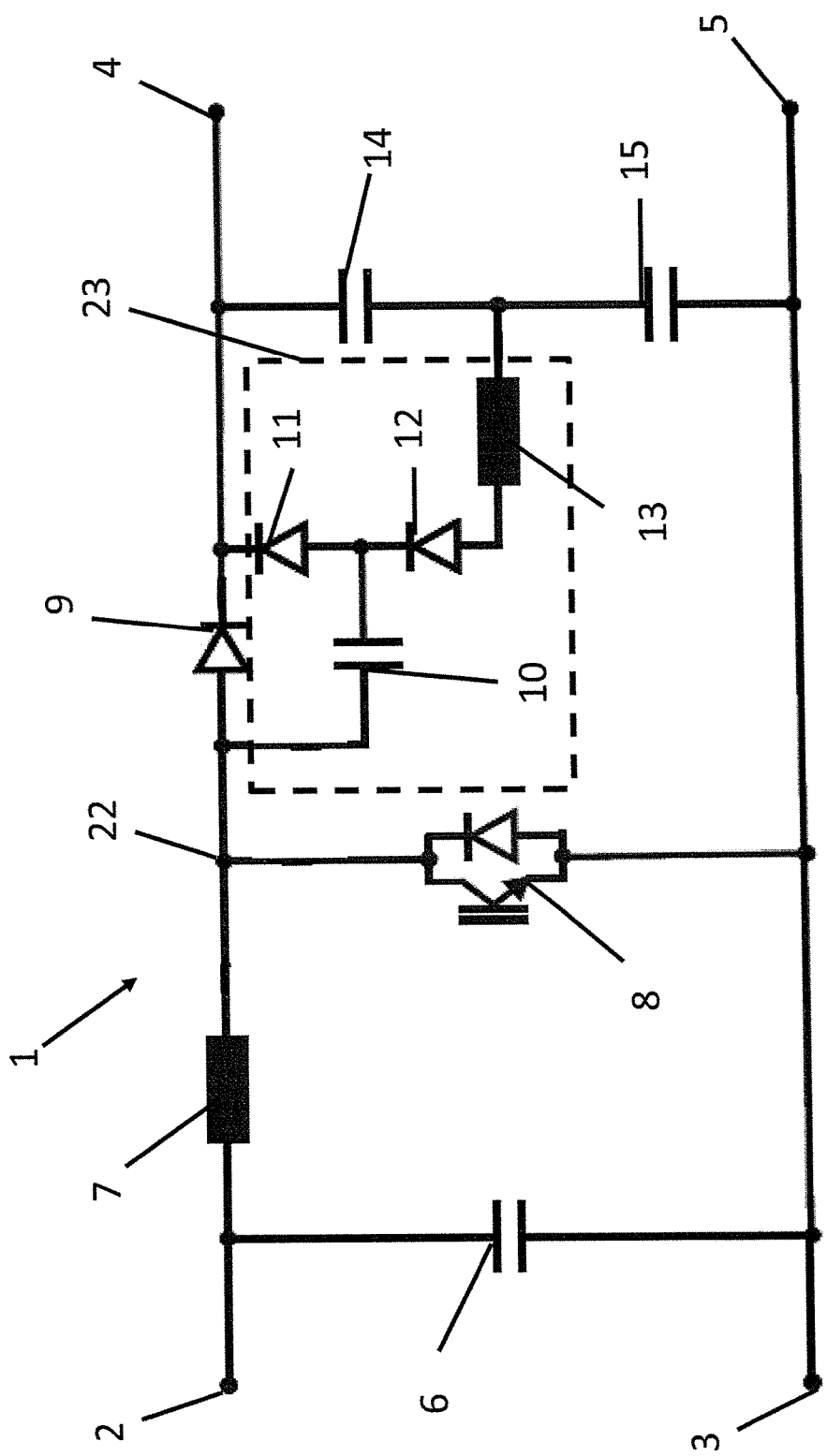
FIG. 1 shows an embodiment of a step-up converter according to the disclosure.

FIG. 1 shows a circuit arrangement for a step-up converter 1 having a first DC voltage input 2 and a second DC voltage input 3, between which an input capacitance 6 is arranged. An output capacitance in the form of a series connection of a first output capacitor 14 and a second output capacitor 15 is arranged between a first DC voltage output 4 and a second DC voltage output 5. The first DC voltage input 2, as known from conventional step-up converters, is connected to the first DC voltage output 4 via a first inductance 7 and a first diode 9. A junction point 22 between the first inductance 7 and the first diode 9 is connected via a semiconductor switch 8 both to the second DC voltage input 3 and to the second DC voltage output 5. In addition, the step-up converter 1 comprises a snubber circuit 23 comprising a charging path and a discharging path. The discharging path, emanating from the junction point 22, runs via a series connection of a capacitor 10 and a second diode 11 to the first DC voltage output 4. The charging path connects a junction point between the capacitor 10 and the second diode 11 via a series connection of a third diode 12 and a second inductance 13 to an intermediate point between the first output capacitor 14 and the second output capacitor 15. The order of the series connection of the third diode 12 and the second inductance 13 is arbritary.

During the operation of the step-up converter 1, at a point in time at which the semiconductor switch 8 is opened, the capacitor 10 is charged approximately to twice the voltage of the output capacitor 15. Subsequently, the current is conducted further through the first inductance 7 via the capacitor 10 and the second diode 11 to the DC voltage output 4 and discharges the capacitor 10. Once the capacitor 10 is discharged, the current commutates to the first diode 9. When the semiconductor switch 8 is closed, the capacitor 10 is charged again to twice the voltage of the second output capacitor 15 by means of the voltage of the capacitor 15 via the second inductance 13, the third diode 12 and the semiconductor switch 8. This happens as a resonant charging process, wherein the charging current corresponds approximately to a sinusoidal half-cycle in terms of shape and the third diode 12 prevents a continuation of the resonance process and hence discharging of the capacitor 15. In this way, the snubber circuit 23 achieves the effect that the semiconductor switch 8 can be opened in a voltage-free manner or at least with a reduced voltage drop across the semiconductor switch 8 in comparison with a conventional step-up converter without a snubber circuit 23. Furthermore, a slowed-down current increase in the switch 8 during the switch-on process is achieved. Accordingly, the switching losses of the semiconductor switch 8 are reduced and the efficiency of the step-up converter 1 is correspondingly improved.

Figure 2:
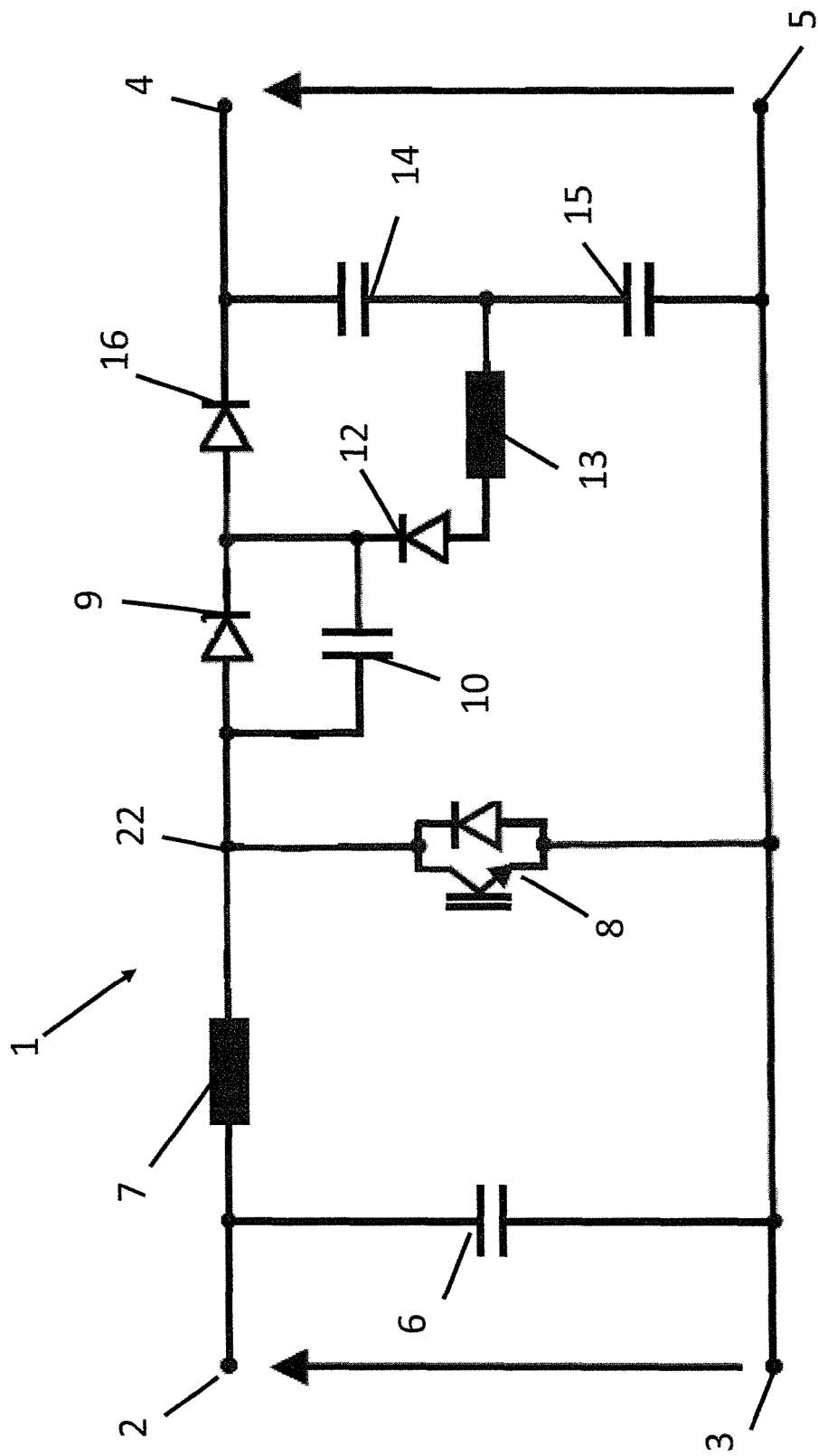
FIG. 2 shows a further embodiment of a step-up converter according to the disclosure.

The step-up converter 1 in accordance with the embodiment in FIG. 2 differs from the step-up converter in accordance with FIG. 1 in that a second diode 16 arranged between the first diode 9 and the first DC voltage output 4 is used instead of the second diode 11. The manner of operation of this circuit is substantially identical to the manner of operation of the circuit from FIG. 1.

Figure 3:
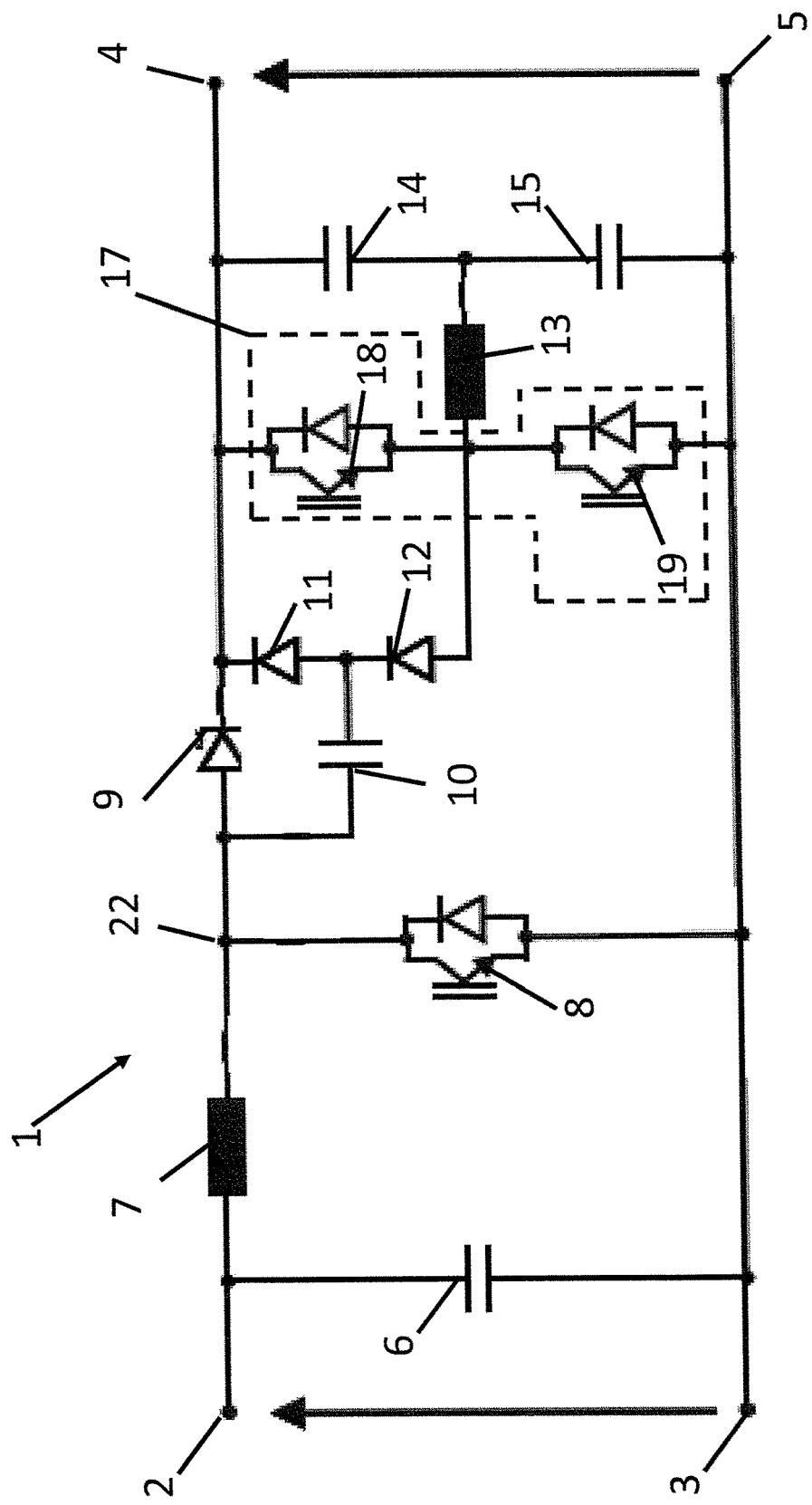
FIG. 3 shows a further embodiment of a step-up converter according to the disclosure with a compensation circuit.

The step-up converter 1 in accordance with the embodiment in FIG. 3 contains, in addition to the step-up converter in accordance with FIG. 1, a compensation circuit 17 having a first compensation switch 18 and a second compensation switch 19 that are arranged between the first DC voltage output 4 and the second DC voltage output 5 as a series circuit and are connected at their center point to the connection to the junction point of the third diode 12 and the second inductance 13. The compensation switch 19 can optionally be embodied just as a diode. The compensation circuit serves to set the voltage distribution between the first output capacitor 14 and the second output capacitor 15 to a desired value, in particular to compensate for an asymmetry of the voltage distribution on account of the operation of the snubber circuit. As in the example embodiment in FIG. 8, instead of the inductance 13 the compensation circuit can also use a separate inductance that is used additionally and independently of the inductance 13 only for the compensation circuit and is connected to the intermediate point of the output capacitors 14, 15 in a controllable manner via the compensation switches 18, 19. As an alternative to the circuit shown, it is also possible to connect the compensation switch 18 to the first DC voltage input 2 and thus to recharge the capacitor 15 on the input side.

A further type of balancing of the voltage distribution between the output capacitors that is not shown here consists in placing at the output of the step-up converter 1 a load that draws the energy from the output capacitors in an unequal manner. In one embodiment of the disclosure, a three-level bridge, for example a so-called NPC inverter, is connected to the output of the step-up converter 1, including the junction point between the two output capacitors 14, 15. The bridge can be driven such that the drawing of energy from the two output capacitors compensates for the unequal energy distribution between the capacitors as a result of the operation of the step-up converter.

Figure 4:
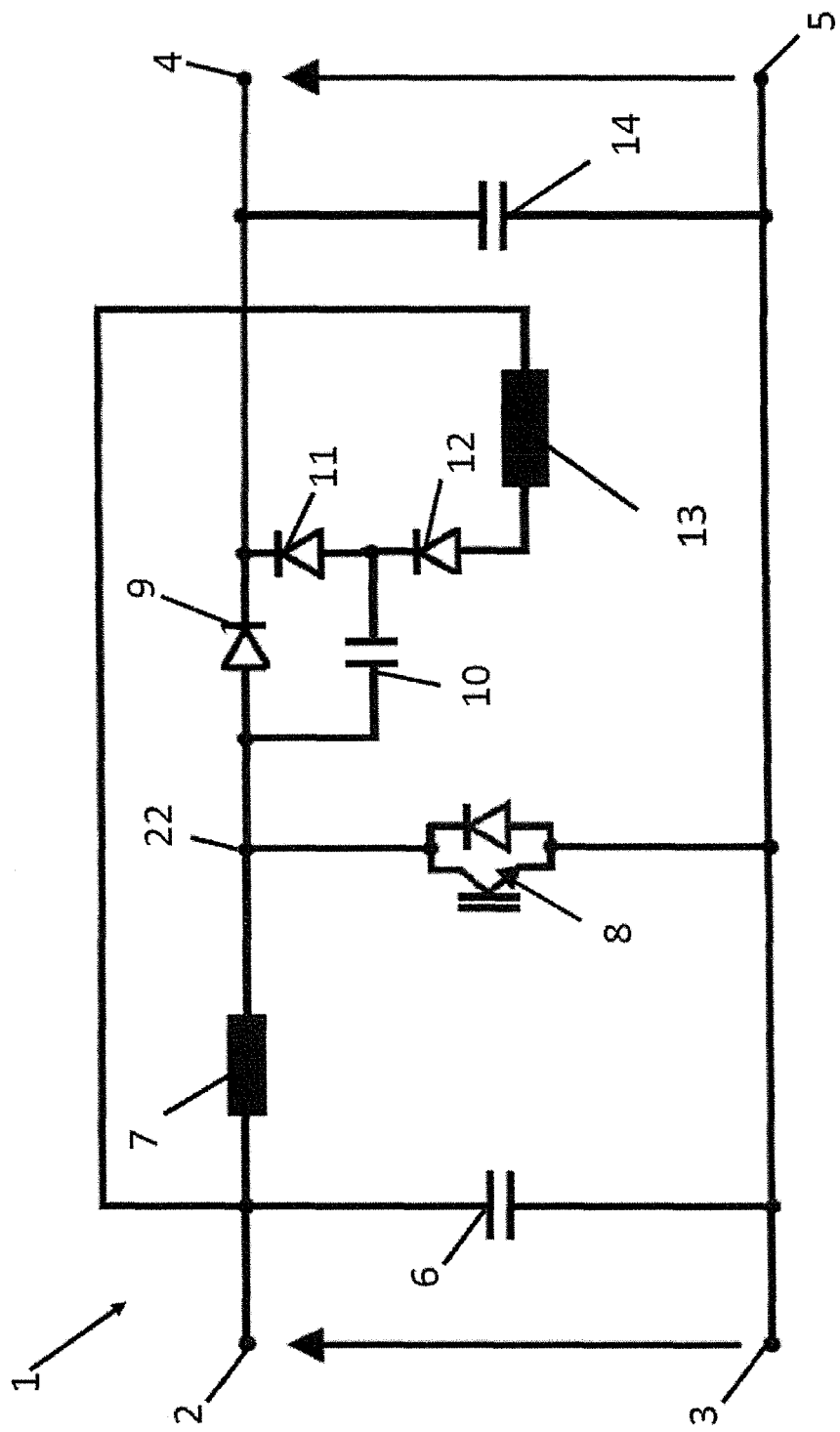
FIG. 4 shows a further embodiment of the step-up converter according to the disclosure with a connection of the charging path to the DC voltage input.

FIG. 4 shows an embodiment of a step-up converter 1 according to the disclosure, in which the output capacitance is formed solely by a single output capacitor 14. The charging path runs in this case from the junction point between the capacitor 10 and the second diode 11 via the third diode 12 and the second inductance 13 to the first DC voltage input 2. In this embodiment, the capacitor 10 is charged by the energy of the input side of the step-up converter 1 during the switch-on phase of the semiconductor switch 8.

Figure 5:
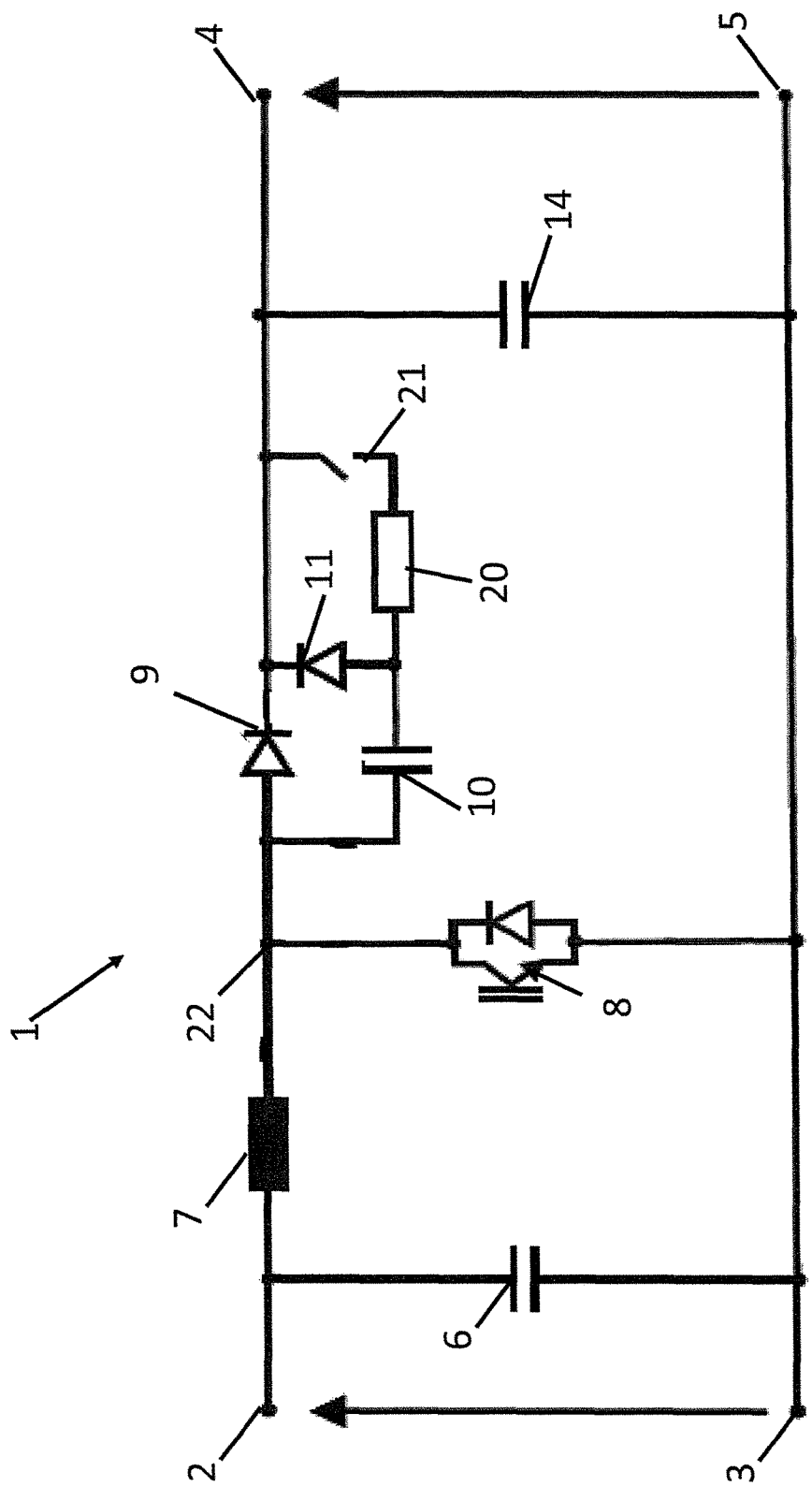
FIG. 5 shows a further embodiment of a step-up converter according to the disclosure with a resistive charging path.

The circuit of a step-up converter 1 according to the disclosure in accordance with FIG. 5 comprises, instead of a resonant snubber circuit 23, a charging path formed by the series connection of a switch 21 and a resistance 20. In this embodiment, the capacitor 10 is charged by the switch 21 being closed at a point in time at which the semiconductor switch 8 is closed. In this case, the resistance 20 is dimensioned such that the charging current of the capacitor 10 is suitably limited in order to avoid an overload of the switch 21 or of the semiconductor switch 8. The resistance 20 can also be omitted, and/or the switch 21 can be operated in a clocked manner or in linear mode.

Figure 6:
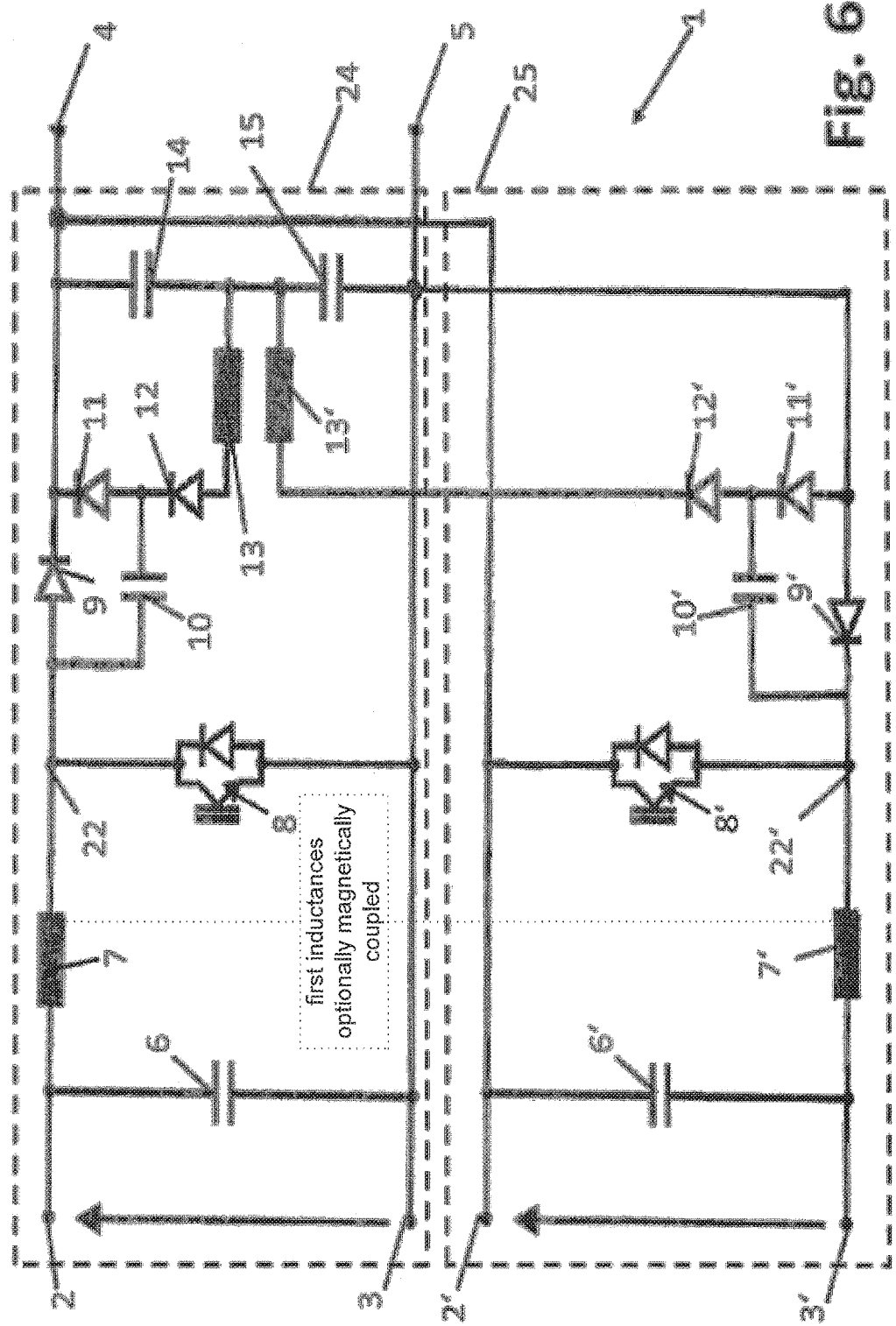
FIG. 6 shows a further embodiment of a step-up converter according to the disclosure in symmetrical layout.

FIG. 6 shows an embodiment of a step-up converter 1 as a symmetrical step-up converter comprising a first subunit 24 and a second subunit 25. In this case, the first subunit 24 corresponds to the embodiment in accordance with FIG. 1. The second subunit 25 is mirrored relative to the first subunit 24 with regard to the first and second DC voltage inputs. Accordingly, the snubber circuits of the first subunit 24 and of the second subunit 25 are respectively assigned to one of the two output capacitors 14, 15. Hence the selective drawing of energy for the two subunits from the correspondingly assigned output capacitors, as described above, is partly or completely compensated for. Even in the case where different input voltages are present at the DC voltage inputs 2, 3 of the first subunit 24 and/or the DC voltage inputs 2', 3', of the second subunit 25, this compensation results, because the unbalancing of the voltages via the two output capacitors 14 and 15 is not caused by a different power conversion of the subcircuits 24 and 25, but rather by the resonance process and thus by the component tolerances of the components 10, 10', 13 and 13', and by the repetition rate of the resonance process. The degree of compensation can accordingly be set by the choice of the clock frequencies with which the two subunits 24, 25 are operated, wherein the subcircuit that is assigned to the capacitor having the higher voltage has to be operated with a higher clock frequency. The clock frequency of the subunit whose snubber circuit is assigned to the output capacitor having an undesirably high voltage can be increased in order to achieve a desired voltage distribution between the output capacitors. This can become necessary, for example, because an unequal drawing of energy from the two output capacitors 14, 15 can arise during operation on account of the component tolerances of, in particular, the capacitors 10, 10' and the second inductances 13, 13'.

Figure 7:
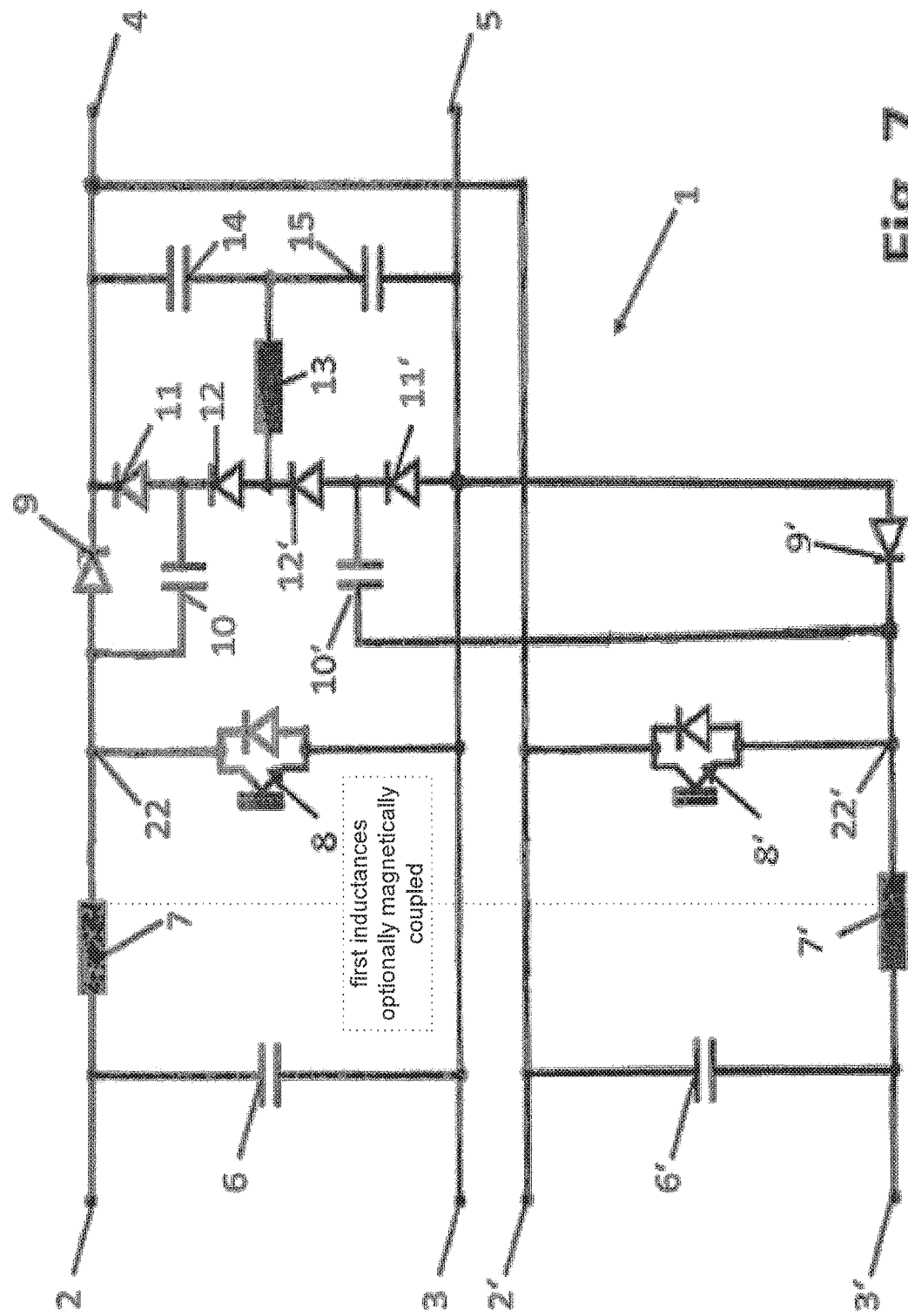
FIG. 7 shows a further embodiment of a step-up converter according to the disclosure in symmetrical layout with a jointly used inductance.

FIG. 7 shows an embodiment of a symmetrical step-up converter 1, in which the second inductance 13 can be utilized jointly by both subunits. This is possible, in particular, if the two subunits are clocked in a such a manner with offset with respect to one another that the charging phases of the capacitors 10, 10' do not overlap in time.

Figure 8:
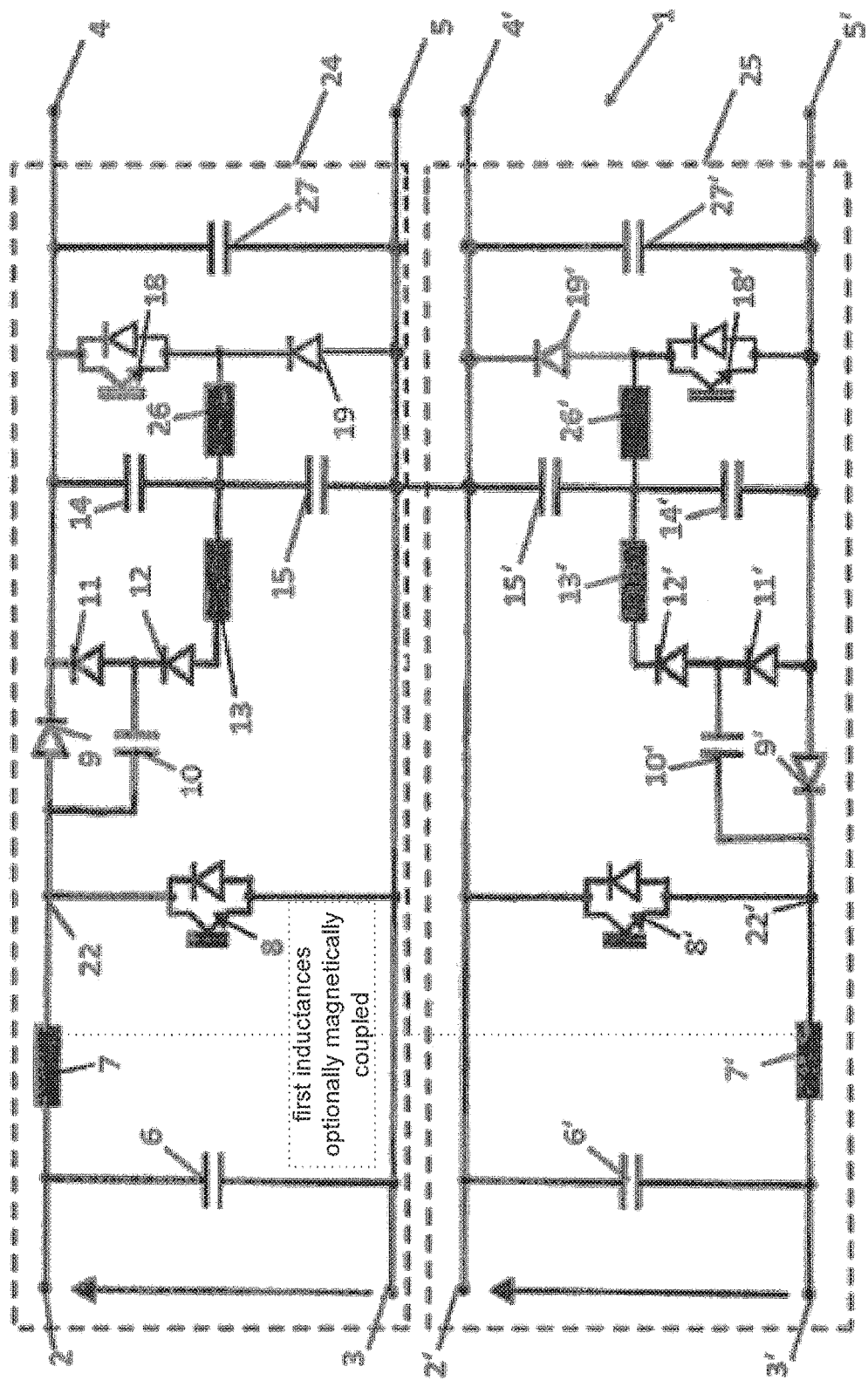
FIG. 8 shows a further embodiment of a step-up converter according to the disclosure in symmetrical layout with compensation circuits.

FIG. 8 illustrates a symmetrical step-up converter 1 comprising a first subunit 24 and a second subunit 25, the construction of which corresponds each to that of the step-up converter of FIG. 3. However, here the variants already mentioned in context with the description of FIG. 3 are realized, namely that the compensation switches 19, 19' are embodied just as diodes and that separate inductances 26, 26' are provided that are used additionally and independently of the inductances 13, 13' only for the compensation circuits and are connected to the intermediate points of the output capacitors 14, 15 and 14', 15', respectively, in a controllable manner via the compensation switches 18, 19 and 18', 19', respectively. The compensation circuits evidently form a step-down converter here, such that any other step-down converter circuits can also be used, in principle, at this point. In addition, in the example embodiment in FIG. 8, further capacitances 27, 27' are provided between the DC voltage outputs 4, 5 and 4', 5'. FIG. 8 furthermore shows by way of example that, in the case of a symmetrical step-up converter, the DC voltage outputs 4, 5 and 4', 5' of the first and second subunits 24, 25 can also be interconnected in series instead of interconnected in parallel as, for example, in the case of the embodiments in FIGS. 6 and 7.

Figure 9:
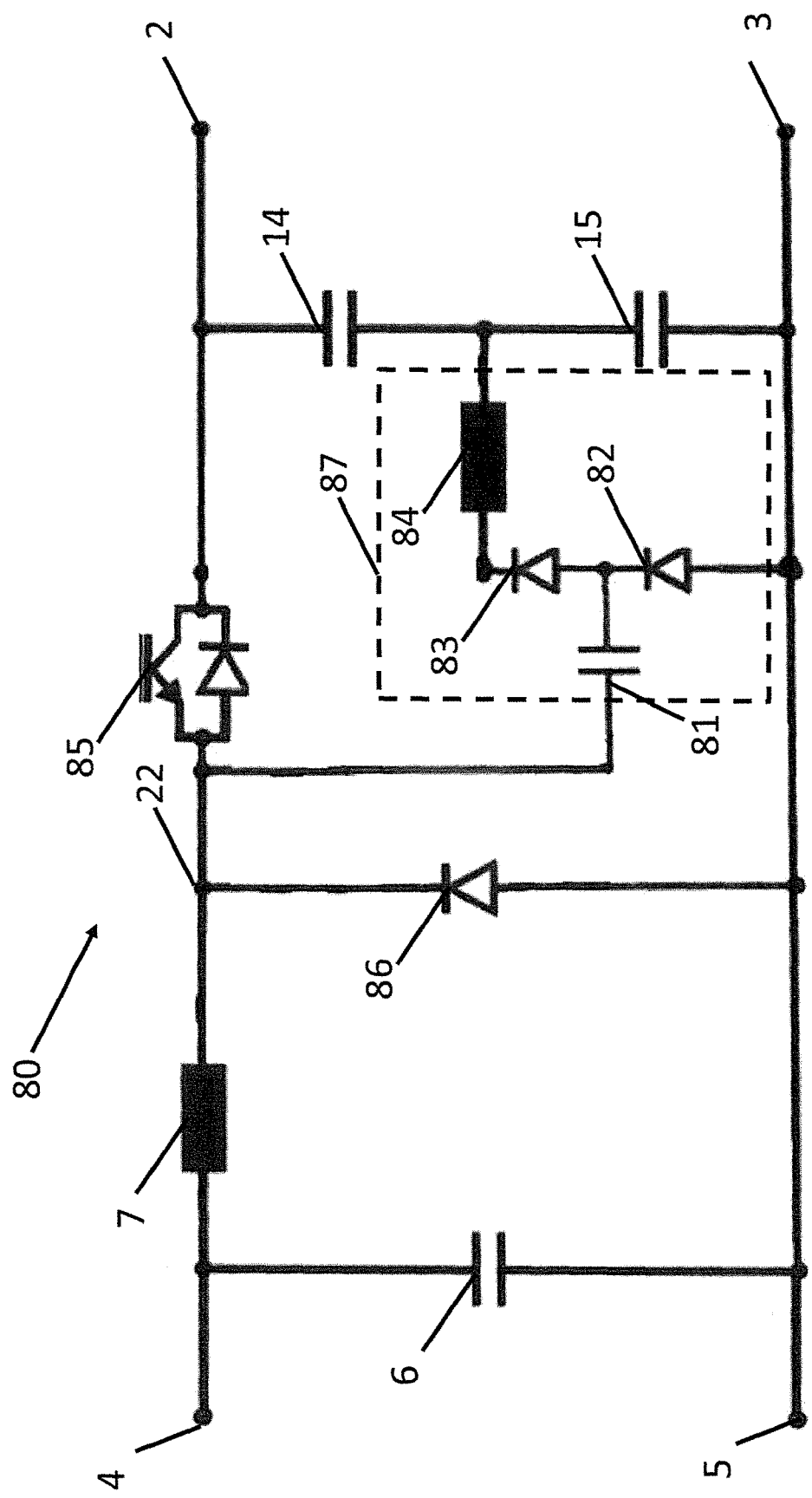
FIG. 9 shows an instance where the teaching in accordance with the application is applied to the case of a step-down converter.

In FIG. 9, the inventive teaching is applied to the case of a step-down converter 80. As known from conventional step-down converters, a first DC voltage input 2 is connected to a first DC voltage output 4 via a series connection of a first inductance 7 and a semiconductor switch 85. The second DC voltage input 3 is directly connected to the second DC voltage output 5. A first diode 86 as a connection to the first DC voltage input 3 is connected between a junction point 22 between the first inductance 7 and the semiconductor switch 85. In addition, a snubber circuit 87, comprising a capacitor 81, a second diode 82, a third diode 83, and a second inductance 84, is connected to the junction point 22, the second DC voltage input 3 and the intermediate point of the series circuit of the divided input capacitors 14, 15 in a manner comparable to the case of the step-up converter in accordance with FIG. 1. Via the capacitor 81 and the second diode 82 this snubber circuit 87 also provides a discharging path arranged in parallel with the first diode 86. The charging path correspondingly runs via the third diode 83 and the second inductance 84, such that the energy for charging the capacitor 81 is drawn from the capacitor 14 assigned to the snubber circuit 87. The operation of the step-down converter 80 analogously corresponds to the operation of the step-up converter 1. The capacitor 81 is discharged when the semiconductor switch 85 is opened, and is charged from the capacitance 14 when the semiconductor switch 85 is closed.

It goes without saying that it is possible for the diverse variants illustrated on the basis of the example of the step-up converter 1 in FIGS. 2 to 8 also analogously to be applied to the case of the step-down converter.

Figure 10:
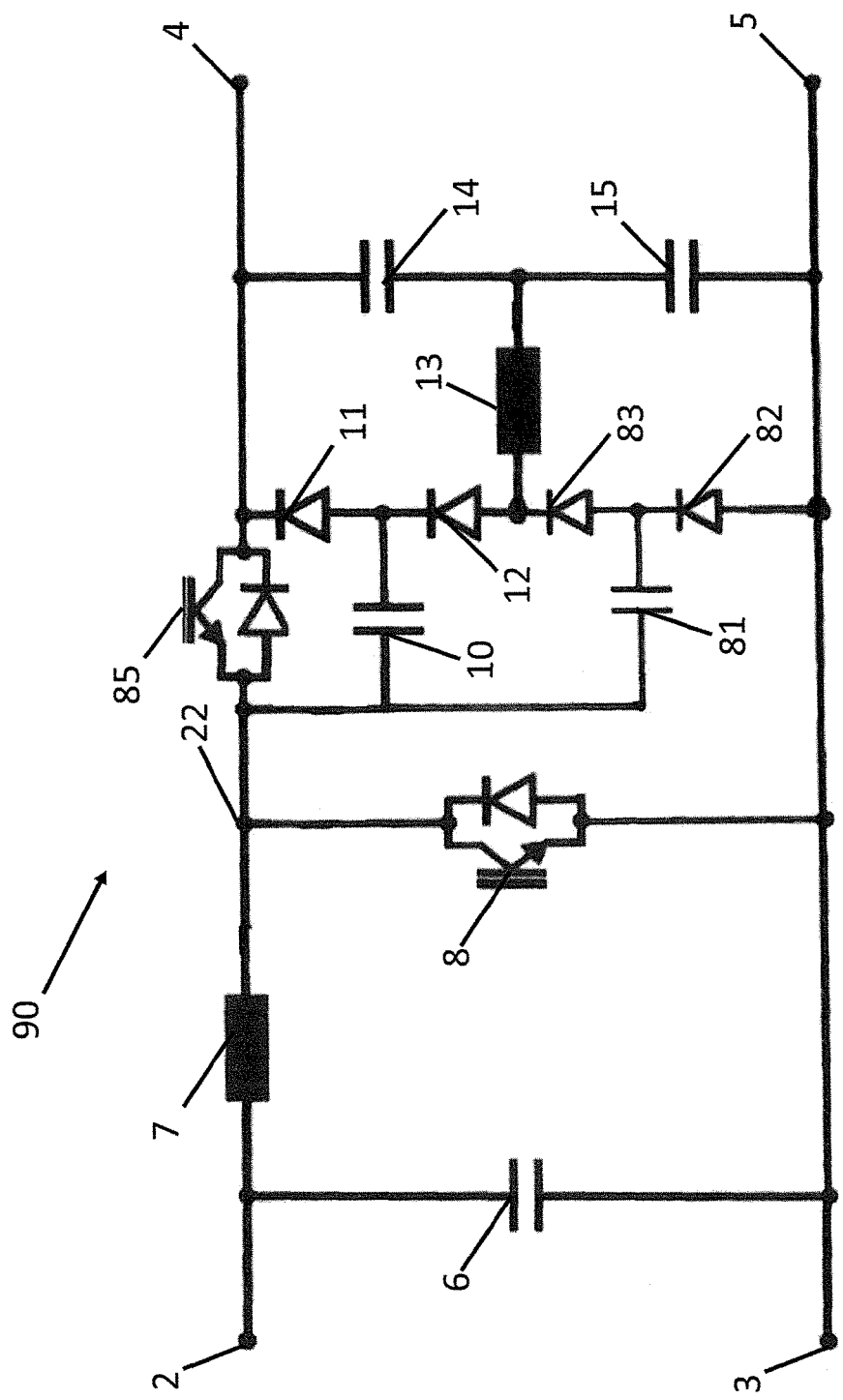
FIG. 10 shows the instance where the teaching in accordance with the application is applied to a bidirectional converter.

In FIG. 10, the components of the step-up converter 1 and of the step-down converter 80 were combined to form a bidirectional converter 90 allowing operation both as a step-up converter and as a step-down converter. In the case of the step-up converter, the energy flows from the DC voltage terminals 2, 3 to the DC voltage terminals 4, 5, and in the opposite direction in the case of the step-down converter. It is possible to change between the two operating modes by adapting the clocking of the semiconductor switches 8, 85. Soft switching of the semiconductor switches 8, 85 can be achieved in both operating modes. It is particularly advantageous to use the bidirectional converter 90 for example as a highly efficient battery converter within a photovoltaic installation in which the intermediate circuit of an inverter or a photovoltaic generator is connected to the DC voltage terminals 4, 5, while a battery is connected to the terminals 2, 3. By changing the operating mode, it is possible to switch back and forth between charging and discharging of the battery.

Figure 11:
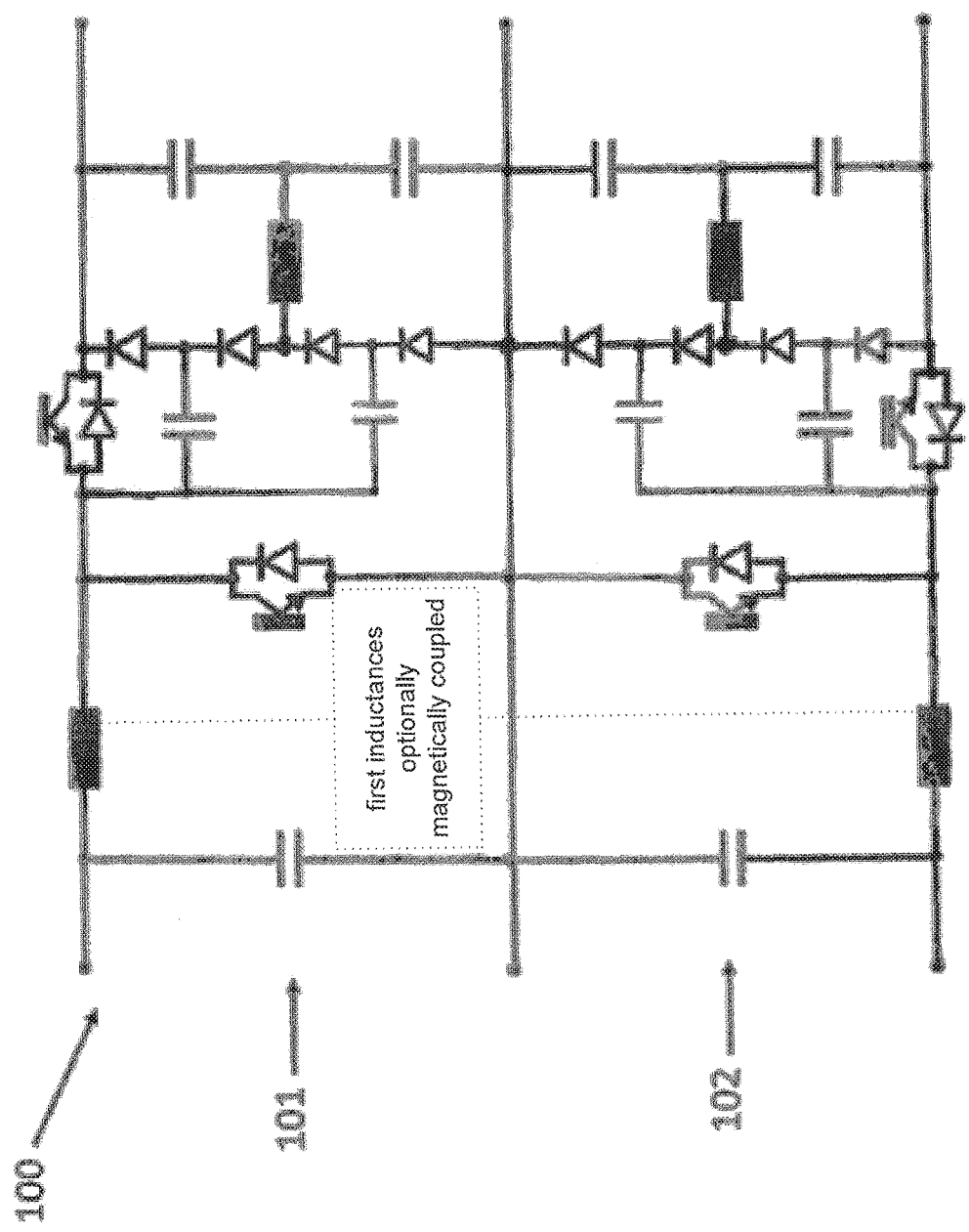
FIG. 11 shows a symmetrical layout of the bidirectional converter with two subunits.

In FIG. 11, the concept of the bidirectional converter is developed further to a symmetrical layout. In this case, the bidirectional converter 100 comprises a first subunit 101 and a second subunit 102 that are embodied in a mirror-inverted fashion with respect to one another with regard to the DC voltage terminals.

Figure 12:
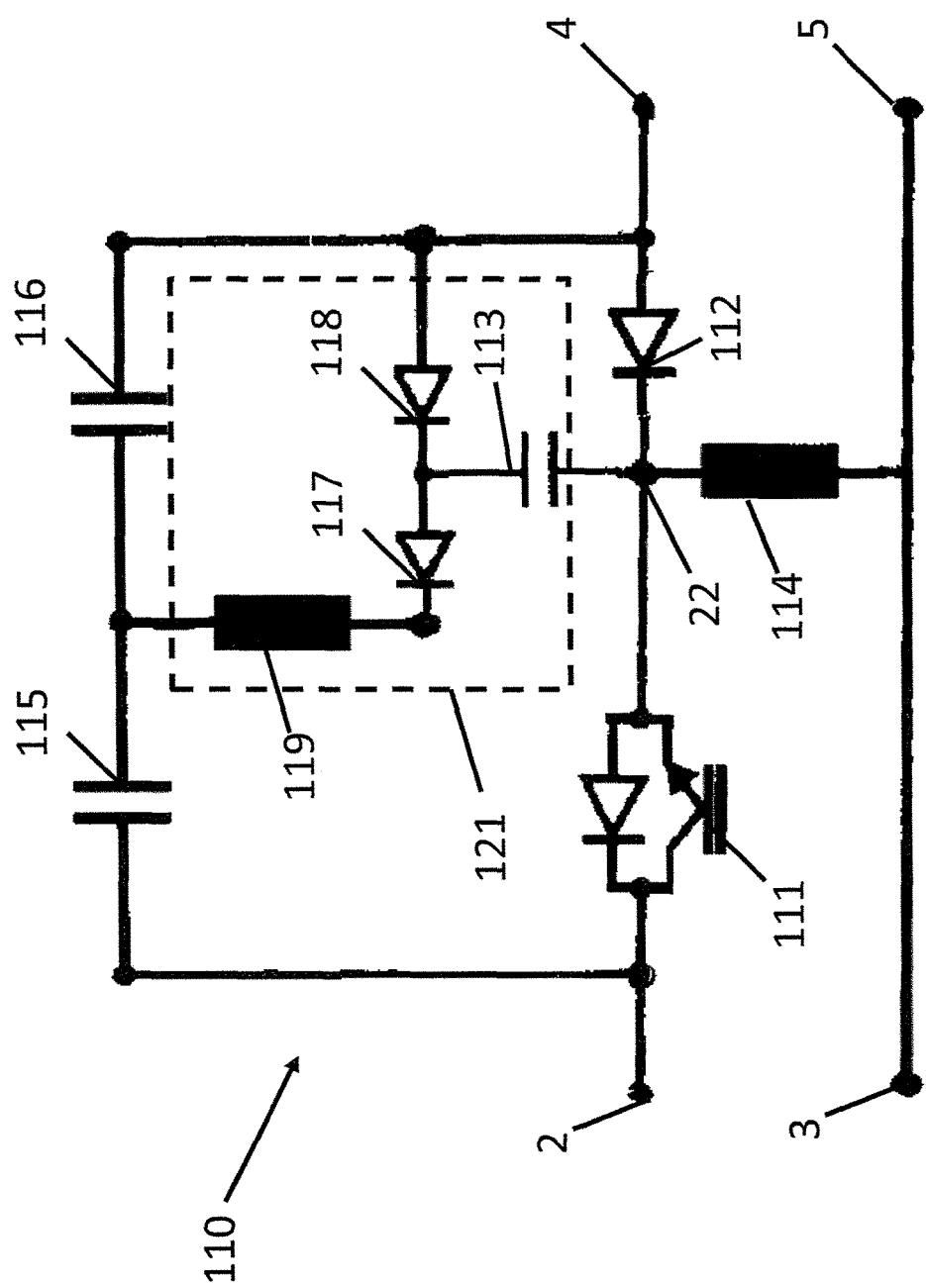
FIG. 12 shows the instance where the teaching in accordance with the application is applied to the case of a buck-boost converter.

The inventive teaching is likewise applicable to the case of a buck-boost converter 110 as is shown in FIG. 12. As known from conventional buck-boost converters, a first DC voltage input 2 is connected to a first DC voltage output 4 via a series connection of a semiconductor switch 111 and a first diode 112. The second DC voltage input 3 is in turn directly connected to the second DC voltage output 5. A first inductance 114 connects the first DC voltage input 3 to a junction point 22 between the semiconductor switch 111 and the first diode 112. In addition, two series-connected capacitances 115, 116 are arranged between the first DC voltage input 2 and the first DC voltage output 4. A snubber circuit 121 comprising a capacitor 113, a second diode 118 and a third diode 117 is again arranged between the junction point 22, the first DC voltage output 4 and the intermediate point between the two capacitances 115, 116. Also here the snubber circuit 23 provides a discharging path via the capacitor 113 and the second diode 118, and a charging path via the second inductance 119 and the third diode 117. The capacitor 113 is discharged by the opening of the semiconductor switch 111, and is charged again from the capacitance 115 when the semiconductor switch 111 is closed.

Figure 13:
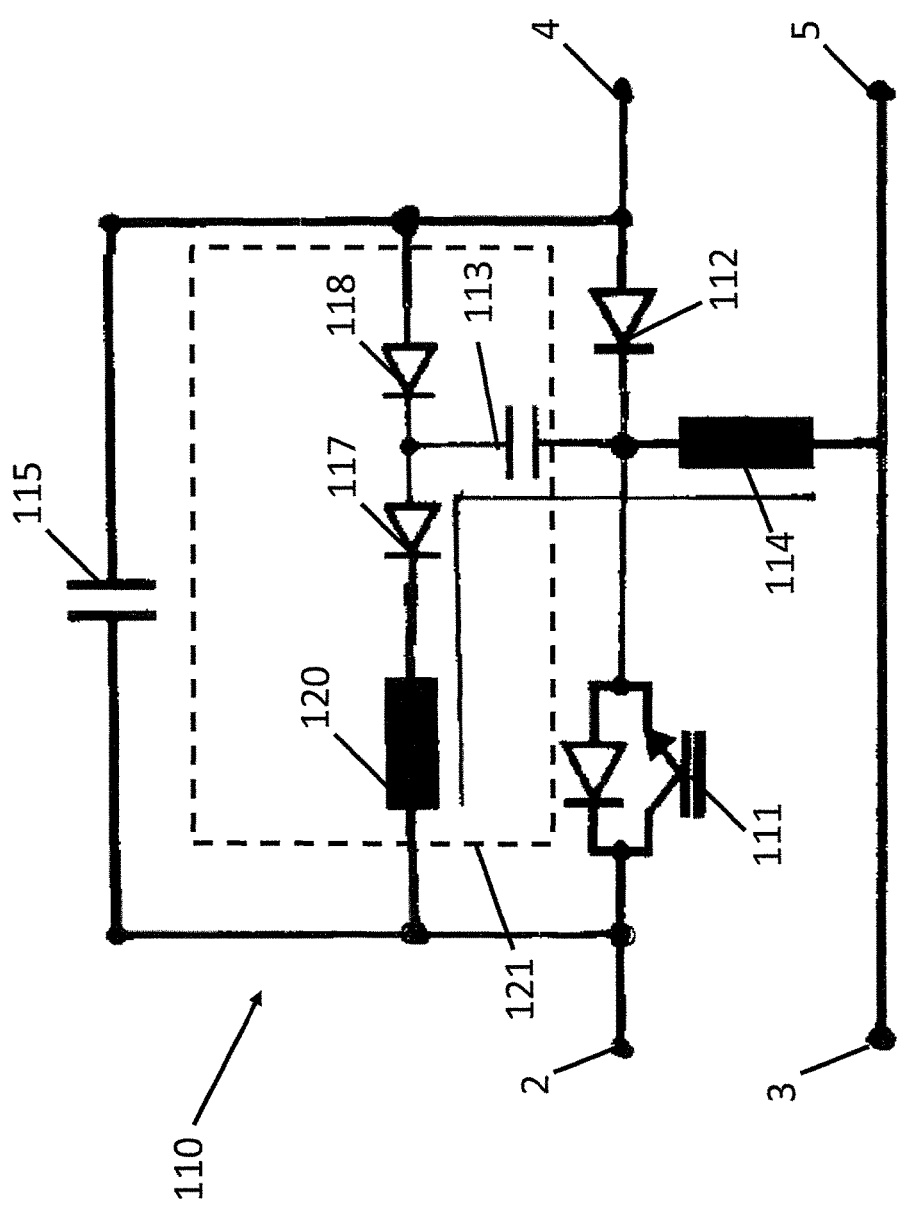
FIG. 13 shows an embodiment of a buck-boost converter with magnetically coupled inductances.

Finally, FIG. 13 shows a variant of the buck-boost converter 110 with magnetic coupling between the first inductance 114 and the second inductance 120. The embodiment of the technical teaching according to the disclosure applied to the case of the buck-boost converter can also be configured and supplemented with the further variants disclosed for the case of the step-up converter. In particular, the described procedures for compensating for an undesired capacitor voltage distribution can advantageously be applied to this application.

The disclosure is not restricted to the embodiments explicitly shown, but rather can be modified in many ways, and in particular can be combined with other embodiments shown or known to the person skilled in the art.

The invention claimed is:

1. A step-up converter, comprising:
   a first inductance electrically connecting a first DC voltage input of the step-up converter to a first junction point;
   a step-up converter switch connecting the first junction point to a second DC voltage input and a second DC voltage output of the step-up converter;
   a first diode connecting the first junction point to a first DC voltage output of the step-up converter; and
   a snubber circuit comprising a charging path and a discharging path,
   wherein the discharging path runs as a series connection of a capacitor and a second diode from the first junction point to the first DC voltage output,
   wherein the charging path is connected at its one end to a junction point between the capacitor and the second diode and is arranged such that the capacitor immediately begins charging when the step-up converter switch is switched on, and
   wherein the charging path is connected at its other end to the first DC voltage input.

2. The step-up converter as claimed in claim 1, wherein the charging path is arranged for charging the capacitor from an input capacitance arranged between the first and second DC voltage inputs.

3. The step-up converter as claimed in claim 1, wherein the charging path comprises a series connection of a second inductance and a third diode.

4. The step-up converter as claimed in claim 1, wherein the first diode is connected to the first DC voltage output of the step-up converter via the second diode.

5. The step-up converter as claimed in claim 1, wherein the discharging path is arranged in parallel with the first diode.

6. The step-up converter as claimed in claim 1, wherein the step-up converter switch is directly connected to the first junction point.

7. The step-up converter as claimed in claim 1, wherein the charging path is directly connected at its one end to the junction point between the capacitor and the second diode, and wherein the charging path is directly connected at its other end to the first DC voltage input.

8. A symmetrical step-up converter comprising a first and a second subunit that are embodied each as a step-up converter, comprising:
   a first inductance electrically connecting a first DC voltage input of the step-up converter to a first junction point;
   a step-up converter switch connecting the first junction point to a second DC voltage input and a second DC voltage output of the step-up converter;
   a first diode connecting the first junction point to a first DC voltage output of the step-up converter; and
   a snubber circuit comprising a charging path and a discharging path,
   wherein the discharging path runs as a series connection of a capacitor and a second diode from the first junction point to the first DC voltage output,
   wherein the charging path is connected at its one end to a junction point between the capacitor and the second diode and is arranged such that the capacitor immediately begins charging when the step-up converter switch is switched on, and
   wherein the charging path is connected at its other end to the first DC voltage input.

9. The symmetrical step-up converter as claimed in claim 8, wherein the first inductance of the first subunit is magnetically coupled to the first inductance of the second subunit.

10. An operating method for a step-up converter that comprises:
    a first inductance electrically connecting a first DC voltage input of the step-up converter to a first junction point;
    a step-up converter switch connecting the first junction point to a second DC voltage input and a second DC voltage output of the step-up converter;
    a first diode connecting the first junction point to a first DC voltage output of the step-up converter; and
    a snubber circuit comprising a charging path and a discharging path,
    wherein the discharging path runs as a series connection of a capacitor and a second diode from the first junction point to the first DC voltage output,
    wherein the charging path is connected at its one end to a junction point between the capacitor and the second diode and is arranged such that the capacitor immediately begins charging when the step-up converter switch is switched on, and
    wherein the charging path is connected at its other end to the first DC voltage input,
    wherein the step-up converter is driven such that an output voltage between the first and second DC voltage outputs is greater than an input voltage between the first and second DC voltage inputs by less than a factor of 2.

11. An inverter comprising a step-up converter, comprising:
    a first inductance electrically connecting a first DC voltage input of the step-up converter to a first junction point;
    a step-up converter switch connecting the first junction point to a second DC voltage input and a second DC voltage output of the step-up converter;
    a first diode connecting the first junction point to a first DC voltage output of the step-up converter; and
    a snubber circuit comprising a charging path and a discharging path,
    wherein the discharging path runs as a series connection of a capacitor and a second diode from the first junction point to the first DC voltage output,
    wherein the charging path is connected at its one end to a junction point between the capacitor and the second diode and is arranged such that the capacitor immediately begins charging when the step-up converter switch is switched on, and
    wherein the charging path is connected at its other end to the first DC voltage input.

12. A step-up converter, embodied as a symmetrical step-up converter comprising a first subunit and a second subunit, wherein each of the subunits comprises:
    a first inductance electrically connecting a first DC voltage input of the step-up converter to a first junction point;
    a step-up converter switch connecting the first junction point to a second DC voltage input and a second DC voltage output of the step-up converter;
    a first diode connecting the first junction point to a first DC voltage output of the step-up converter, and
    a snubber circuit comprising a charging path and a discharging path,
    wherein the discharging path runs as series connection of a capacitor and a second diode from the first junction point to the first DC voltage output, and
    wherein the charging path emanating from a junction point between the capacitor and the second diode is arranged such that the capacitor immediately begins charging when the step-up converter switch is switched on.

13. The step-up converter as claimed in claim 12, wherein the charging path is arranged for charging the capacitor from an input capacitance arranged between the first and second DC voltage inputs.

14. The step-up converter as claimed in claim 12, wherein the charging path is arranged for charging the capacitor from an output capacitance arranged between the first and second DC voltage outputs.

15. The step-up converter as claimed in claim 14, wherein the output capacitance comprises a series connection of a first and a second output capacitor with an intermediate point, and wherein the charging path connects the junction point between the capacitor and the second diode to the intermediate point of the first and second output capacitors.

16. The step-up converter as claimed in claim 15, wherein an intermediate point between the second inductance and the third diode is connected to the first and second DC voltage outputs via a controllable compensation circuit.

17. The step-up converter as claimed in claim 15, wherein the intermediate point between the first and second output capacitors is connected to the first and second DC voltage outputs via a controllable compensation circuit comprising a separate third inductance.

18. The step-up converter as claimed in claim 15, wherein the snubber circuits of the subunits are respectively assigned to one of the two output capacitors.

19. The step-up converter as claimed in claim 15, wherein the snubber circuits of the subunits comprise a common second inductance.

20. An operating method for a step-up converter as claimed in claim 15, wherein a driving frequency of the first subunit relative to a driving frequency of the second subunit is determined depending on the voltage distribution between the first output capacitor and the second output capacitor.

21. The step-up converter as claimed in claim 12, wherein the first diode is connected to the first DC voltage output of the step-up converter via the second diode.

22. The step-up converter as claimed in claim 12, wherein the discharging path is arranged in parallel with the first diode.

23. The step-up converter as claimed in claim 12, wherein the first DC voltage input or the second DC voltage input of the first subunit is separate from the respective DC voltage input of the second subunit.

24. The step-up converter as claimed in claim 12, wherein the first inductance of the first subunit is magnetically coupled to the first inductance of the second subunit.

25. The step-up converter as claimed in claim 12, wherein the charging path comprises a series connection of a second inductance and a third diode.

26. An inverter comprising a step-up converter, embodied as a symmetrical step-up converter comprising a first subunit and a second subunit, wherein each of the subunits comprises:
- a first inductance electrically connecting a first DC voltage input of the step-up converter to a first junction point;
- a step-up converter switch connecting the first junction point to a second DC voltage input and a second DC voltage output of the step-up converter;
- a first diode connecting the first junction point to a first DC voltage output of the step-up converter, and
- a snubber circuit comprising a charging path and a discharging path,
- wherein the discharging path runs as series connection of a capacitor and a second diode from the first junction point to the first DC voltage output, and
- wherein the charging path emanating from a junction point between the capacitor and the second diode is arranged such that the capacitor immediately begins charging when the step-up converter switch is switched on.

27. The inverter of claim 26, wherein the first DC voltage input or the second DC voltage input of the first subunit is separate from the respective DC voltage input of the second subunit, and wherein DC voltage inputs of the first subunit are arranged for connection to a first generator and DC voltage inputs of the second subunit are arranged for connection to a second generator different from the first generator.

* * * * *